US009515815B2

(12) United States Patent
Gerdes

(10) Patent No.: US 9,515,815 B2
(45) Date of Patent: Dec. 6, 2016

(54) TRANSPOSITIONAL MODULATION SYSTEMS, METHODS AND DEVICES

(71) Applicant: TM IP HOLDINGS, LLC, Tucson, AZ (US)

(72) Inventor: Richard C. Gerdes, Tucson, AZ (US)

(73) Assignee: TM IP Holdings, LLC, Tucson, AZ (US)

( * ) Notice: Subject to any disclaimer, the term of this patent is extended or adjusted under 35 U.S.C. 154(b) by 0 days.

(21) Appl. No.: 14/430,510

(22) PCT Filed: Mar. 17, 2014

(86) PCT No.: PCT/US2014/030704
§ 371 (c)(1),
(2) Date: Mar. 23, 2015

(87) PCT Pub. No.: WO2014/145868
PCT Pub. Date: Sep. 18, 2014

(65) Prior Publication Data
US 2016/0173302 A1    Jun. 16, 2016

Related U.S. Application Data

(63) Continuation-in-part of application No. 13/841,889, filed on Mar. 15, 2013, now Pat. No. 9,014,293.
(Continued)

(51) Int. Cl.
*H04L 27/04* (2006.01)
*H04L 27/20* (2006.01)
(Continued)

(52) U.S. Cl.
CPC ............. *H04L 7/0331* (2013.01); *H04L 27/10* (2013.01); *H04L 27/30* (2013.01);
(Continued)

(58) Field of Classification Search
CPC ...................................................... H04B 11/00
(Continued)

(56) References Cited

U.S. PATENT DOCUMENTS 3,706,945 A    12/1972   Yanagidaira et al. .......... 332/17
3,968,486 A    7/1976    Gerdes .......................... 340/347
(Continued)

FOREIGN PATENT DOCUMENTS

WO    WO2012082781 A1    6/2012

OTHER PUBLICATIONS

Office Action issued in U.S. Appl. No. 14/668,536, dated Nov. 2, 2015 (12 pgs).
(Continued)

*Primary Examiner* — Qutbuddin Ghulamali
(74) *Attorney, Agent, or Firm* — Fish & Richardson P.C.

(57) ABSTRACT

Systems, methods and devices for transmitting and receiving and demodulating transpositional modulated signals, for increasing information bandwidth of defined communication channels, and for time-delay shifting an input signal in accordance to an input control signal are provided. One such method of increasing the information bandwidth of a defined communication channel includes receiving a first modulated signal having a first carrier signal frequency; receiving a second modulated signal having a second carrier signal frequency, the second modulated signal being modulated with information independent of information modulating the first carrier signal, the second carrier signal frequency being harmonically or sub-harmonically related to the first carrier signal frequency; and combining the first and second signals.

19 Claims, 14 Drawing Sheets

Related U.S. Application Data

(60) Provisional application No. 61/798,437, filed on Mar. 15, 2013, provisional application No. 61/794,786, filed on Mar. 15, 2013, provisional application No. 61/798,120, filed on Mar. 15, 2013, provisional application No. 61/794,942, filed on Mar. 15, 2013, provisional application No. 61/794,642, filed on Mar. 15, 2013.

(51) Int. Cl.
| | | |
|---|---|---|
| *H04L 7/033* | (2006.01) | |
| *H04L 27/10* | (2006.01) | |
| *H04L 27/30* | (2006.01) | |
| *H04L 27/00* | (2006.01) | |

(52) U.S. Cl.
CPC ........... *H04L 2027/0051* (2013.01); *H04L 2027/0055* (2013.01); *H04L 2027/0067* (2013.01)

(58) Field of Classification Search
USPC .............................. 375/295, 296, 299, 271
See application file for complete search history.

(56) References Cited

U.S. PATENT DOCUMENTS

| | | | |
|---|---|---|---|
| 4,259,888 A | 4/1981 | Gross | 84/627 |
| 4,301,415 A | 11/1981 | McFayden | 328/24 |
| 4,342,245 A | 8/1982 | Gross | 84/604 |
| 4,613,974 A | 9/1986 | Vokac et al. | 375/37 |
| 4,680,633 A | 7/1987 | Gerdes et al. | 358/171 |
| 4,989,219 A | 1/1991 | Gerdes et al. | 375/17 |
| 5,021,786 A | 6/1991 | Gerdes | 341/143 |
| 5,124,706 A | 6/1992 | Gerdes | 341/156 |
| 5,155,672 A | 10/1992 | Brown | 363/43 |
| 5,165,017 A | 11/1992 | Eddington et al. | 381/68.4 |
| 5,184,218 A | 2/1993 | Gerdes | 358/133 |
| 5,200,715 A * | 4/1993 | Gerdes | H03D 1/10 332/151 |
| 5,200,822 A * | 4/1993 | Bronfin | H04N 17/00 348/473 |
| 5,327,237 A | 7/1994 | Gerdes et al. | 348/476 |
| 5,557,333 A | 9/1996 | Jungo et al. | 348/473 |
| 6,173,062 B1 | 1/2001 | Dibachi et al. | 381/312 |
| 6,522,697 B1 * | 2/2003 | Spickermann | H04B 10/5161 375/271 |
| 6,559,757 B1 | 5/2003 | Deller et al. | 340/310.01 |
| 8,472,514 B2 * | 6/2013 | Dabiri | H03H 21/0021 375/233 |
| 2001/0038309 A1 | 11/2001 | Hagemeyer | 327/552 |
| 2003/0071684 A1 | 4/2003 | Noori | 330/149 |
| 2004/0247041 A1 * | 12/2004 | Biedka | H04L 27/361 375/295 |
| 2004/0252531 A1 | 12/2004 | Cheng et al. | 363/43 |
| 2005/0065901 A1 | 3/2005 | Giong | 706/25 |
| 2007/0212076 A1 | 9/2007 | Roberts et al. | 398/183 |
| 2008/0253479 A1 * | 10/2008 | Davidow | H04L 27/00 375/300 |
| 2009/0154589 A1 | 6/2009 | Monnerie | 375/269 |
| 2011/0043039 A1 | 2/2011 | Mancebo del Castillo Pagola | 307/52 |
| 2011/0151821 A1 * | 6/2011 | Sorrells | H03C 1/62 455/313 |
| 2011/0222621 A1 | 9/2011 | Christensen et al. | 375/271 |
| 2012/0171963 A1 * | 7/2012 | Tsfaty | H04B 11/00 455/41.3 |

OTHER PUBLICATIONS

Inteniational Search Report and Written Opinion issued in related application No. PCT/US13/32565, dated Aug. 2, 2013 (12 pgs).

Invitation to Pay Additional Fees and, Where Applicable, Protest Fee issued in application No. PCT/US14/30704, dated Mar. 25, 2015 (2 pgs).

International Search Report and Written Opinion issued in related application No. PCT/US14/30704, dated Jun. 4, 2015 (13 pgs).

International Preliminary Report on Patentability issued in application No. PCT/US2014/030704, dated Oct. 1, 2015 (10 pgs).

Examiner Prakash Prasai, IP Australia, Patent Examination Report No. 1 for Application No. 2016204884, dated Jul. 22, 2016 (2 pgs).

Examiner Julien Chave, European Patent Office, Partial Supplementary European Search Report for Application No. 14762390.4, dated Jul. 18, 2016 (9 pgs).

M. Leclerc et al: "Performance analysis of an in-band COFDM / FM digital audio broadcasting system", Electrical and Computer Engineering, Sep. 14-17, 1993, pp. 652-655.

Yang Liu et al: "High Order QAM Signals Recognition Based on Layered Modulation", ICCCAS 2009. International Conference on Communications, Circuits and Systems, IEEE, Jul. 23, 2009, pp. 13-76.

Examiner Julien Chave, European Patent Office, Partial Supplementary European Search Report for Application No. 13877917.8, dated Jul. 18, 2016 (9 pgs).

J. B. Evans et al: "The Rapidly Deployable Radio Network", IEEE Journal on Selected Areas in Communications, IEEE Service Center, vol. 17, No. 4, Apr. 1, 1999, pp. 689-703.

Scott Chiu et al: "A 900 MHz UHF RFID Reader Transceiver IC", IEEE Journal of Solid-State Circuits, IEEE Service Center, Piscataway, NJ, USA vol. 42, No. 12, Dec. 1, 2007, pp. 2822-2833.

Examiner Hector Javier Sanchez Vargas, Instituto Mexicano De La Propiedad Industrial, Examination Report for Application No. MX/a/2015/012768, dated Aug. 2, 2016 (4 pgs).

\* cited by examiner

The Sub-Cycle Calibration method of TM demodulation.

TRANSPOSITIONAL MODULATION SYSTEMS, METHODS AND DEVICES

This application is a continuation-in-part of pending U.S. application Ser. No. 13/841,889, filed Mar. 15, 2013. This application also claims priority from U.S. Provisional Application Ser. No. 61/798,437, filed Mar. 15, 2013; 61/794,786, filed Mar. 15, 2013; 61/798,120, filed Mar. 15, 2013; 61/794,942, filed Mar. 15, 2013 and 61/794,642, filed Mar. 15, 2013, the contents of which are incorporated herein by reference.

The present disclosure is generally related to signal processing, and more particularly is related to systems, methods and devices for transmitting and receiving ti and demodulating transpositional modulated signals, for increasing information bandwidth of defined communication channels, and for time-delay shifting an input signal in accordance to an input control signal.

Existing transmission systems, whether carrying voice, video or data, have bandwidth limits imposed by domestic and world regulatory agencies controlling the utilization of the frequency spectra. Carrier modulation methods have evolved from the original Amplitude Modulation to present methods combining two or more it carriers with Amplitude, Frequency or Phase modulations in various combinations. Advanced carrier modulation methods were developed to maximize energy throughout the assigned channel bandwidth thus providing the greatest available information bandwidth for the assigned communication channel.

A new fundamental carrier modulation was developed and first patented (see, e.g., U.S. Pat. No. 4,613,974 to Vokac et al., incorporated in its entirety herein) that applies a new type of carrier modulation that does not interfere with amplitude, frequency and/or phase modulation coexisting on the same carrier signal.

The concept of Transpositional (TM) Modulation was based on an earlier concept of how to add information to a carrier signal without affecting its amplitude, frequency or phase (see, e.g., U.S. Pat. No. 4,613,974 to Vokac et al., incorporated in its entirety herein). By producing an inflection as shown below, information can be conveyed by the carrier signal. This method is not detected by existing de-modulators of amplitude, frequency or phase modulation.

Using the previously patented method of generation the following time-domain waveform is generated with the inflections exaggerated for clarity. In real-world applications, the inflections are not visible.

A deficiency of earlier methods of generating this type of waveform is a small amplitude variation that required removal by an adjusting circuit. For example, FIG. 1 is an illustration of a TM Modulated signal 100 generated in accordance with the prior art techniques taught by U.S. Pat. No. 4,613,974. As can be seen, an amplitude variation error exists between negative peaks 101 and 102.

Thus, a heretofore unaddressed need exists in the industry to address the aforementioned deficiencies and inadequacies.

Embodiments of the present disclosure provide systems, methods and devices for transmitting and receiving and demodulating transpositional modulated signals, for increasing information bandwidth of defined communication channels, and for time-delay shifting an input signal in accordance to an input control signal. In one embodiment, a method of increasing the information bandwidth of a defined communication channel is provided that includes the steps of: receiving a first modulated signal having a first carrier signal frequency; receiving a second modulated signal having a second carrier signal frequency, the second modulated signal being modulated with information independent of information modulating the first carrier signal, the second carrier signal frequency being harmonically or sub-harmonically related to the first carrier signal frequency; and combining the first and second signals.

In another embodiment, a time-shift modulator for time-delay shifting an input signal in accordance to an input control signal is provided. The time-shift modulator includes an all-pass filter modified with a voltage-controlled time delay.

In another embodiment, a method of increasing communication bandwidth within a fixed communication channel is provided that includes the step of: adding a second transpositional modulated signal to a combined signal, the combined signal comprising a first transpositional modulated signal and a first fundamental carrier signal, wherein the second transpositional modulated signal is added to the combined signal using a second fundamental carrier signal having a same frequency as the first fundamental carrier signal, and having a phase angle of 90 degrees with respect to the first fundamental carrier signal.

In another embodiment, a method for providing an increased ultrasonic communication information bandwidth is provided that includes the step of adding transpositional modulation to an ultrasonic communication signal by direct amplitude modulation of a single ultrasonic transducer.

In another embodiment, a method for providing an increased ultrasonic communication information bandwidth is provided that includes the steps of: adding transpositional modulation to an ultrasonic communication signal by directly amplitude modulating a first ultrasonic transducer with the fundamental carrier signal component of transpositional modulation; and directly amplitude modulating a second ultrasonic transducer with the third harmonic carrier signal component of transpositional modulation.

In another embodiment, a method for providing an increased ultrasonic communication information bandwidth is provided that includes the step of: adding transposition modulation fundamental carrier signal and third harmonic carrier signal components to an ultrasonic communication signal by directly amplitude modulating a single ultrasonic transducer using a wide bandwidth modulation technique.

In another embodiment, a method for providing an increased ultrasonic communication information bandwidth that includes the step of: adding transpositional modulation to an ultrasonic communication signal by directly angle modulating a first ultrasonic transducer with the fundamental carrier signal component of transpositional modulation and directly angle modulating a second ultrasonic transducer with the third harmonic carrier signal component of transpositional modulation.

In another embodiment, a method for providing increased ultrasonic communication information bandwidth that includes the step of: adding transposition modulation fundamental carrier signal and third harmonic carrier signal components to an ultrasonic communication signal by directly angle modulating a single ultrasonic transducer using a wide bandwidth modulation technique.

In yet another embodiment, a system for providing increased optical information communication bandwidth. The system includes an optical beam and an optical modulator. The system is configured to directly modulate the optical beam with a transpositional modulation signal.

In another embodiment, a method for providing increased optical information communication bandwidth is provided that includes the step of: directly modulating an optical beam of a first frequency with a transpositional modulation fundamental carrier frequency component.

In still another embodiment, a method for providing increased optical information communication bandwidth that includes the step of: directly modulating an optical beam of a second frequency with a transpositional modulation third harmonic component signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Many embodiments of the disclosure may take the form of computer-executable instructions, including algorithms executed by a programmable computer or microprocessor. However, the disclosure can be practiced with other computer system configurations as well. Certain aspects of the disclosure can be embodied in a special-purpose computer or data processor that is specifically programmed, configured or constructed to perform one or more of the methods or algorithms described below.

Aspects of the disclosure described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks including the cloud. Data structures and transmissions of data particular to aspects of the disclosure are also encompassed within the scope of the disclosure.

Figure 1:
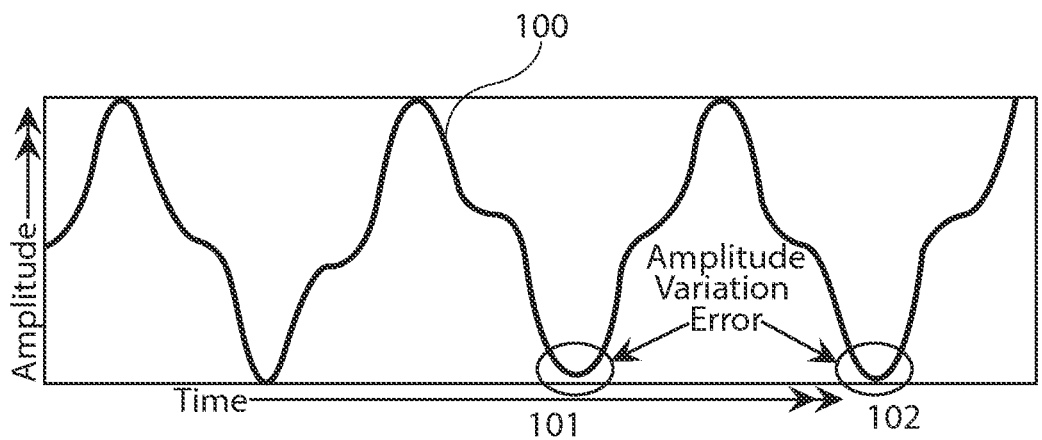
FIG. 1 is an illustration of a TM Modulated signal generated in accordance with the prior art techniques.
Figure 2:
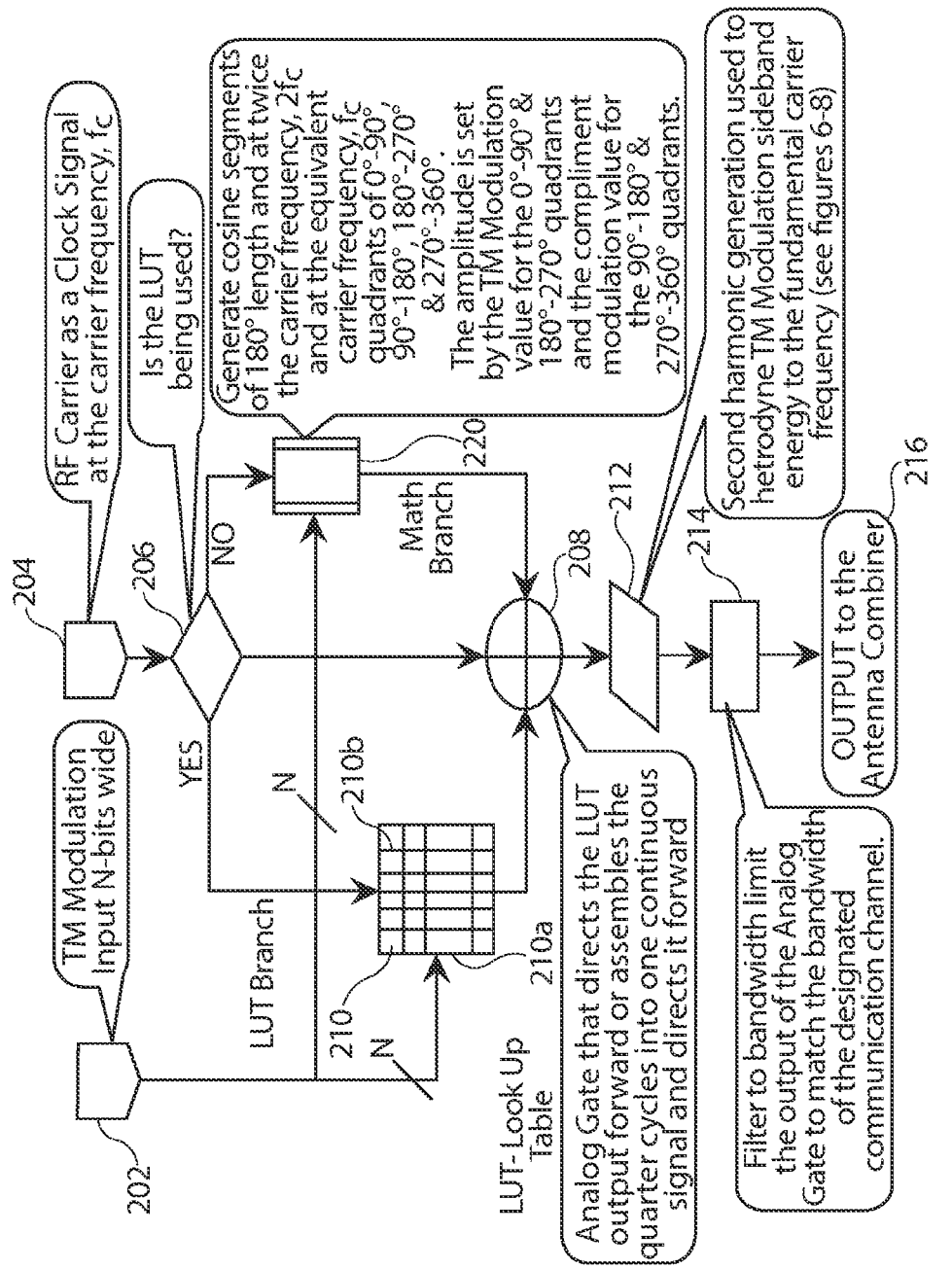
FIG. 2 is a flowchart illustrating a method of modulating a carrier signal, in accordance with a first exemplary embodiment of the present disclosure.

FIG. 2 is a flowchart 200 illustrating a method of modulating a carrier signal, in accordance with a first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently in reverse order, depending on the functionality involved, as would be understood by those reasonably skilled in the art of the present invention. The method solves the amplitude variation problem of the prior art (e.g., as shown in FIG. 1 above) and may be implemented in either hardware or software, or any combination thereof. The method shown in FIG. 2, which may be referred to as the "quarter-cycle assembly" (QC) method, may include a Look-Up-Table (LUT) 210 as a fast method of obtaining the results, that otherwise may be produced utilizing mathematical functions, without the need of continuously performing the math. The QC method is based in the time-domain.

Figure 3:
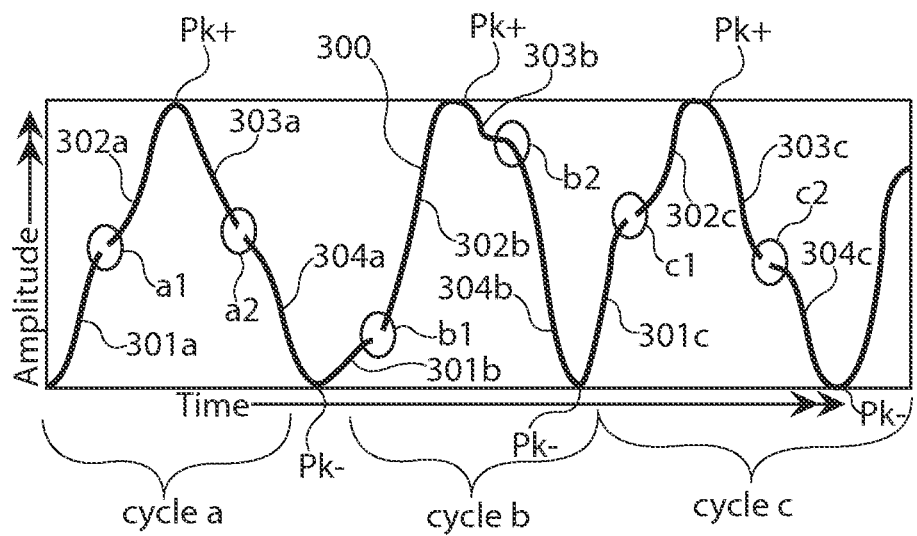
FIG. 3 is an illustration of a signal generated as quarter-cycles, in accordance with an embodiment of the present disclosure.

Referring to FIG. 3, the modulated output signal 300 from the method shown in FIG. 2 includes four distinct quarter cycle segments for each full signal cycle. FIG. 3 shows three full cycles (e.g., cycles a, b and c), as may be output by the quarter-cycle method shown in FIG. 2. Each cycle is composed of four quarter cycle segments (e.g., 301, 302, 303 and 304). A gap is shown between quarter cycle segments for illustrative purposes only. Further, the amplitude positions of the inflections (a1, a2, b1, b2, c1, c2) are exaggerated for illustration purposes. The inflections are formed between adjacent quarter cycle segments, as shown.

As shown in FIG. 3, the "first" quarter of each cycle (301a, 301b and 301c) may have different amplitudes depending on the value of the applied modulation. The same applies for each other quarter of each cycle shown. That is, the second (302a, 302b, 302c), third (303a, 303b, 303c) and fourth (304a, 304b, 304c) quarters of each cycle may have different amplitudes depending on the value of the applied modulation. When the "first" quarter (e.g., 301a, 301b, 301c) in a cycle has a low amplitude, the "second" quarter (e.g., 302a, 302b, 302c) of that same cycle has a complimenting higher amplitude so that a constant amplitude always exists between the negative peak value (Pk) of the whole cycle and the positive peak value (Pk$_+$) of that cycle. The same is true of the "third" and "fourth" quarters of each cycle. The causes the positive peak values (Pk$_+$) of each cycle to always be the same. The negative peak values (Pk$_-$) are also made equal to eliminate amplitude variations due to the applied modulation values.

As is further shown in FIG. 3, the "first" (301a, 301b, 301c) and "third" (303a, 303b, 303c) quarters for a respective cycle have the same amplitudes. Similarly, the "second" (302a, 302b, 302c) and "forth" (304a, 304b, 304c) quarters for a respective cycle also have the same amplitudes. The purpose for this is to force the area under the curve of each cycle to be the same, regardless of applied modulation value. This ensures that the average value of each cycle is zero this avoiding any "DC" value shift in the carrier signal due to the applied modulation values.

However, it is noted that for some applications, DC shift may be acceptable, and thus there may be an inconsistent area under the curve, i.e. there need not be symmetry among cycles. In such a case, information or "symbols" may be conveyed at a rate of two symbols per cycle, or two different inflection points may be present on each cycle (e.g., one on located along the rising half cycle between the negative peak and positive peak, and the other located along the falling half cycle between the positive peak and negative peak).

Each quarter cycle may be generated by a constant clock or time step hence there is no frequency change from one cycle to the next as a result of the applied modulation value. Each inflection (a1, a2, b1, b2, c1, c2) occurs at precisely the angular equivalent of 180 degree separation from one half cycle to the next half cycle. This ensures that there is no phase change due to the applied modulation value.

Figure 4:
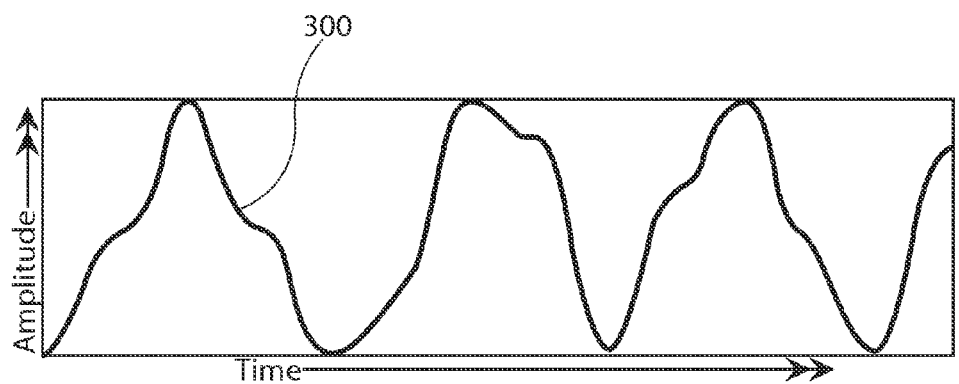
FIG. 4 is an illustration of the signal shown in FIG. 3 after summing the quarter-cycles, in accordance with an embodiment of the present disclosure.

By summing the quarter cycles (e.g., those shown in FIG. 3), a smooth and continuous waveform 300 is obtained, as shown in FIG. 4.

Figure 5:
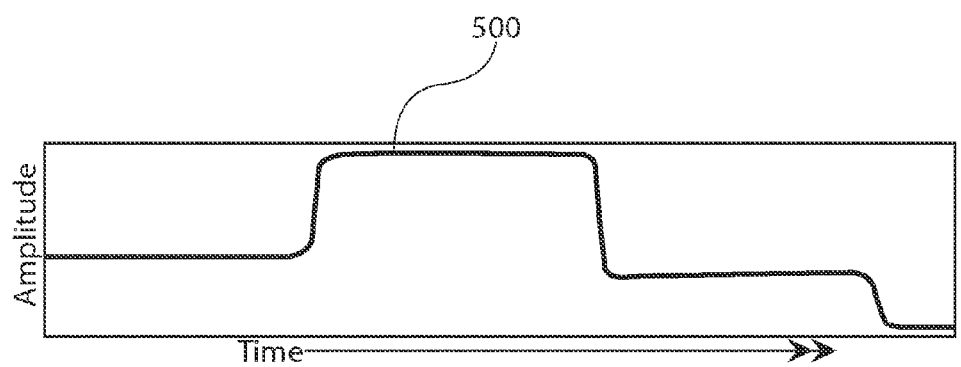
FIG. 5 is an illustration of an input modulation signal which may be used, by embodiments provided by the present disclosure, to generate the signal shown in FIG. 4.

FIG. 5 illustrates a TM modulation signal 500, which is used to produce the modulated signal 300 shown in FIG. 4. As shown in FIGS. 4 and 5, there is one TM Modulation value 500 per carrier cycle. However, as noted above, there may be two TM Modulation values per carrier cycle in the case where the cycles may have a different area under curve, i.e. there need not be symmetry among cycles such that you may convey two symbols on each cycle. In such a case, there could be two TM modulation values per carrier cycle, thereby representing two different symbols (or information) per carrier cycle. This technique may be suitable for transmission over optical fiber, for example, because there will be no other signals occupying the transmission bandwidth; however, DC shift is typically not suitable for transmission over other mediums.

A variable designated as the TM Modulation period, $t_{TMM}$, is the time a TM Modulation value is held, and is an integer multiple of the carrier period. This would imply that, in such a case, the maximum TM Modulation frequency, $f_{TMM}$, is one-half of the carrier frequency, $f_C$. That is, the modulation bandwidth is limited to ½ of $f_C$, as it is known that the Nyquist rate, or lower bound for the sample rate for alias-free signal sampling, is two times the bandwidth of a bandlimited signal. However, where two TM modulation values are present per carrier cycle, then the maximum TM modulation frequency, $f_{TMM}$, equals the carrier frequency, $f_C$. There is no minimum value of $f_{TMM}$, including DC response.

Referring again to FIG. 2, the LUT 210 stores a quarter cycle unique to each value of TM modulation. For each carrier frequency there are four quarter cycles (e.g., as shown in FIG. 3). If there is an assignment of 1 digital bit (N=1) for each TM Modulation period, then there would need to be just two unique TM modulation levels, or two unique sets of two quarter cycles, stored in the LUT 210—one level signifying a logic "0" and a second level signifying a logic "1". If there are two digital bits (N=2) for each $t_{TMM}$ then there would be four levels of potential TM Modulation. Similarly, if there are three bits (N=3) for each $t_{TMM}$, then there would be eight levels of TM Modulation, and so on.

The LUT 210 contains $2^N$ different quarter cycle waveshapes or $4*2^N$ total waveshapes, as each full waveshape is composed of 4 quarter cycle waveshapes. The number of time-steps or clock periods (e.g., the processor or CPU clock for reading the LUT 210) per quarter cycle would depend on the tolerable waveshape perturbations that the electronics for implementing the method can tolerate. At carrier frequencies in the 300 MHz area, this may require sub-nanosecond time steps. Lower carrier frequencies may be more amenable to both TM methods (e.g., the LUT branch and the "math branch," as described herein) and could be heterodyned up to the carrier frequency.

At block 202, a TM Modulation signal is input to the LUT 210. The TM modulation signal may be a signal containing, or represented by, any number of digital bits (e.g., an N-bits wide signal). The LUT 210 contains values or representations for the quarter cycles that may otherwise be generated by the math branch 220. For example, for each TM modulation value, which may be represented by rows 210a (e.g., 1 to $2^N$), a quarter cycle may be associated with the TM modulation value and stored, represented in columns 210b, as coordinate data (e.g., x,y) over a period of increasing time (e.g., from an initial time to ¼ of a cycle). At block 204, a carrier signal is input having a carrier frequency of $f_C$. The carrier signal may be an RF signal and may serve as a clock signal. At block 206, a decision is made as to whether the modulation will be performed using the LUT 210, or using the math branch 220. Either the LUT 210 or the math branch 220 may be utilized to generate the modulated output signal. If the LUT 210 is utilized, the quarter cycles associated with the received TM modulated values will be output from the LUT 210 to the analog gate 208.

If the math branch 220 is utilized, e.g., the math branch 210 is selected from block 206, then the TM modulation signal is input to the math block 220. The math block 220 outputs substantially the same quarter cycle waveforms as would have been output by the LUT block 210 for the same received TM modulation values. However, rather than storing the associated quarter cycle values for each TM modulation value, the math block 220 generates the quarter cycles for each received TM modulation value. The math block 220 generates the modulated quarter cycles by first generating cosine segments of 180° length, at twice the carrier frequency ($2f_C$), and at the equivalent carrier frequency quadrants of 0°-90°, 90°-180°, 180°-270°, and 270°-360°. These generated cosine segments thus make up quarter cycle segments at the carrier frequency. The amplitude is set by the received TM modulation value for the 0°-90° and 180°-270° quadrants (i.e., the "first" and "third" quarter cycles), and the compliment modulation value for the 90°-180° and 270°-360° quadrants. It will be readily understood by those having ordinary skill in the relevant art that any sinusoidal signal can be generated using known mathematical relationships, which may be implemented in circuits and/or software. Thus, the cosine segments of the math branch 220, having an amplitude set by the received TM modulation value, may be generated accordingly.

The math branch 220 performs math calculations to generate the quarter cycle segments using a processor having a clock that is a higher multiple of the carrier frequency—either to execute software code or to drive a hardware-based waveform generator, which may be any known waveform generator. It is likely that the math branch 220 would need a higher clock frequency than the LUT branch 210. The output from either the LUT 210 or the math branch 220 is directed to an analog gate 208 that assembles the quarter cycles into one continuous signal and directs it forward to the heterodyne block 212.

Figure 6:
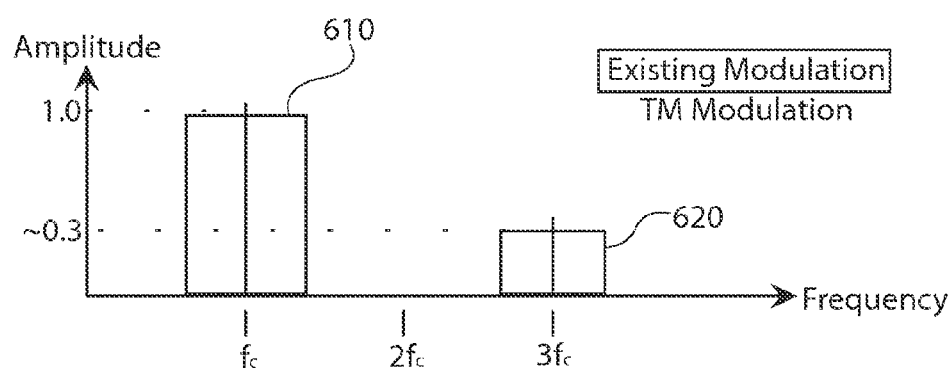
FIG. 6 is a plot illustrating the frequency spectrum of the signal shown in FIG. 4.

For transmission and heterodyne purposes, the frequency domain provides insight to aspects of this disclosure. FIG. 6 is a plot of the frequency spectrum of the TM modulated signal 300 shown in FIG. 4, where $f_C$ is the carrier signal frequency, and $2f_C$, $3f_C$, etc. are the second, third, etc. harmonics of the carrier frequency. The signal 300 has the spectrum as shown in FIG. 6 at the point of origin with visible inflections in some cases.

Figure 7:
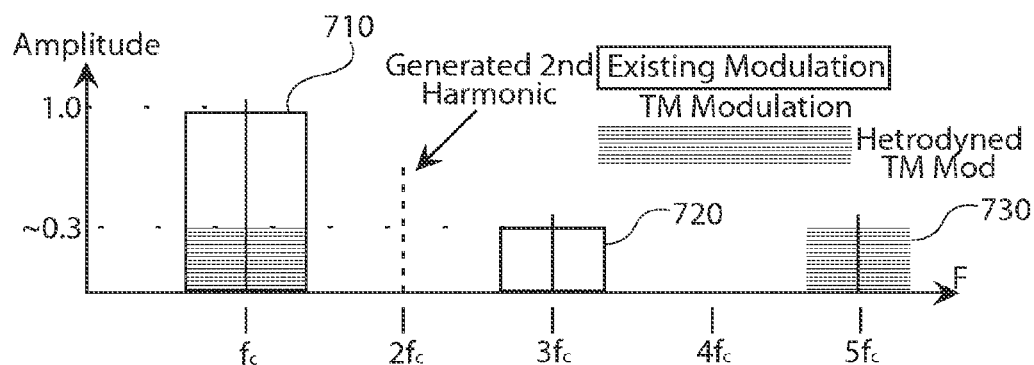
FIG. 7 is a plot illustrating the frequency spectrum resulting from heterodyning the third harmonic component with the second harmonic of the signal shown in FIG. 6, in accordance with an embodiment provided by the present disclosure.

In addition to the fundamental carrier frequency component 610, there is a third harmonic component 620 of the signal 300 that contains a phase modulation. TM modulation components are only at the third harmonic, i.e. the TM modulation components are the third harmonic components 620. There is no second harmonic signal. By generating a second harmonic signal, at block 214, as a local oscillator and using a mixer circuit to heterodyne the third harmonic component, there will be two output frequencies: ($3f_C - 2f_C$) and ($3f_C + 2f_C$). This is illustrated in FIG. 7. The TM modulation component, i.e., the third harmonic component 620, will be shifted down to the fundamental carrier frequency (signal 710). The additive component of the heterodyning, i.e., the fifth harmonic component 730, may be filtered out (e.g., by filter 810 shown in FIG. 8) at block 214, and may be filtered to match the output of the designated communications channel for transmission.

In contrast to known modulation techniques, as provided by the present disclosure the 3rd harmonic is phase shifted, but the phase shift is relative to the fundamental carrier, not the 3rd harmonic. In normal FM and PM transmissions, what is phase shifted is the carrier itself. TM does not alter the fundamental and the 3rd harmonic phase is only related to the fundamental.

The distinction is important for several reasons. For each half-cycle of the fundamental carrier (i.e., each TM modulated Symbol) there are 1.5 cycles of the 3rd harmonic with no modulation. There is only a change of the 3rd harmonic when the data changes (i.e., when the TM modulation signal 500 changes). Thus, there is very little impact on power and spectrum, and another reason why we have transparency with conventional modulation since in most practical applications, there may be 100 or more carrier cycles per TM symbol—limited to the communication channel—like AM and FM broadcast radio, during which there is no change (i.e., no change of modulation) of the 3rd harmonic. It is simply shifted in phase (in time) with respect to the fundamental.

Implementation of the QC method requires analog bandwidth that is three or more times wider than the carrier frequency, as the third harmonic (e.g., $3f_C$) is utilized. Further, the QC method requires a clock frequency that is 16 times the carrier signal frequency for just four time steps per quarter cycle. QC may be generated at a lower carrier signal and heterodyned upward to the desired carrier frequency. The lower carrier frequency will dictate the upper frequency limit of the TM Modulation value.

Figures 9A, 9B:
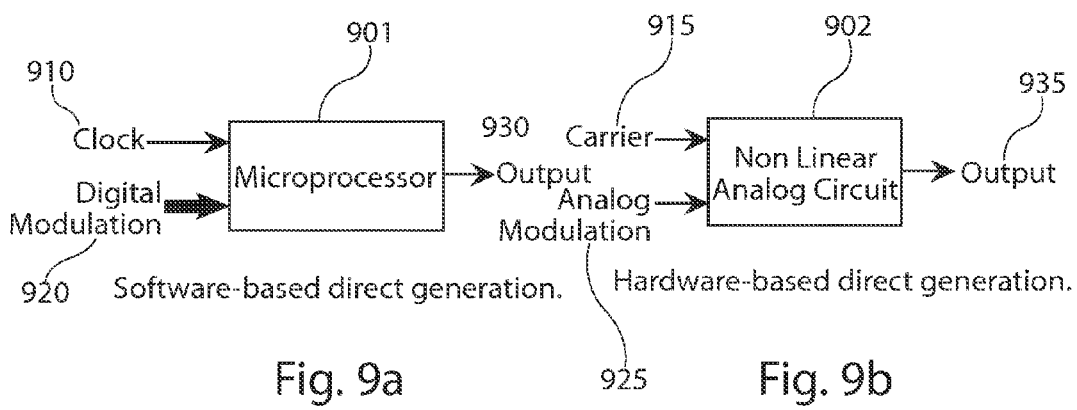
FIG. 9a is a block diagram illustrating a software-based direct spectrum system for generating a signal, in accordance with an embodiment provided by the present disclosure.
FIG. 9b is a block diagram illustrating a hardware-based direct spectrum system for generating a signal, in accordance with an embodiment provided by the present disclosure.

FIGS. 9a and 9b are block diagrams illustrating a Direct Spectrum (DS) generation system and method, in a further embodiment of the present disclosure. The DS generation method may be a simpler implementation of the TM modulation. The DS method generates the sideband spectrum directly and adds the energy to whatever else exists within the bandwidth of the communication channel. The DS method is based in the frequency domain.

Referring to FIG. 6, an existing transmitter has some form of complex modulation. Typical types of complex modulation in use include QAM, QPSK, OFDM, and so on. The sideband energy of the existing modulation is represented by the component 610 in FIG. 6. Adding TM Modulation produces the third harmonic and the TM sideband energy is represented by the component 620. Note that a second harmonic component may be present but contains no modulation.

The second harmonic signal is valuable in that it can be used to shift the TM sideband energy 620 downward to the fundamental carrier frequency 610. This is done by heterodyning using a mixer function that multiplies two sinusoidal input signals together and produces a subtractive and an additive frequency output. Referring to FIG. 7, the hatching represents the energy that has been converted from the third harmonic 720 to the fundamental 710 and 5th harmonic 730.

The use of the second harmonic is optional. A phase-locked-loop, as known in the art, can provide a stable second harmonic. Also, a non-linearity that might exist may actually down-convert some of the sideband energy but may not be stable or a reliable method of down-conversion.

Figure 8:
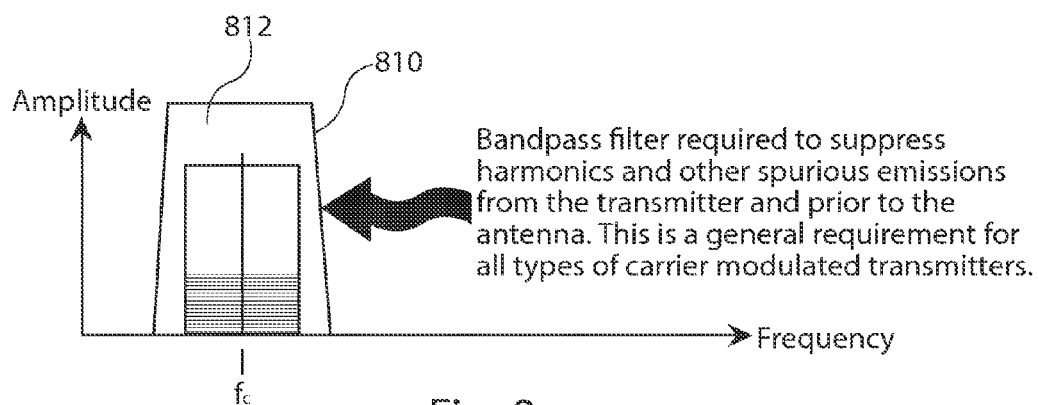
FIG. 8 is an illustration of a filter which may be applied to embodiments provided by the present disclosure.

Communication regulations require that all transmitters must use an output filter to guarantee that no energy be radiated that is outside of the designated communication channel. As shown in FIG. 8, an output filter 810 may be utilized to eliminate the harmonics for transmission in the designated communication channel. The filter may include a passband 812.

Utilizing the concepts described above, FIGS. 9a and 9b illustrate two systems and methods for direct spectrum generation. FIG. 9a illustrates a software-based system and method for direct spectrum generation, while FIG. 9b illustrates a hardware-based system and method for direct spectrum generation. In FIG. 9a a clock signal 910 and a digital modulation signal 920 are input to a microprocessor 901. In FIG. 9b a carrier signal 915 and an analog modulation signal 925 are input into a non-linear analog circuit 902. The third harmonic sidebands (e.g., the TM modulation component 620) are directly generated by microprocessor 901 and/or circuit 902, based on the input signals. The microprocessor 901 and/or circuit 902 further may directly heterodyne the third harmonic sideband 620 with the input clock 910 (FIG. 9a) or carrier 915 (FIG. 9b) to directly create the sideband energy (e.g., 710) at the fundamental frequency. The DS method relies on either software generation of the overall math expression or non-linear analog circuits that execute the math expressions. That is, the microprocessor 901 (FIG. 9a) and/or the circuit 902 (FIG. 9b) directly computes and generates the third harmonic sideband 620 based on the input signals, utilizing known mathematical relationships. The third harmonic sideband 620 is then heterodyned by the microprocessor 901 and/or non-linear analog circuit 902 to shift the third harmonic sideband 620 to the fundamental frequency.

Figure 10:
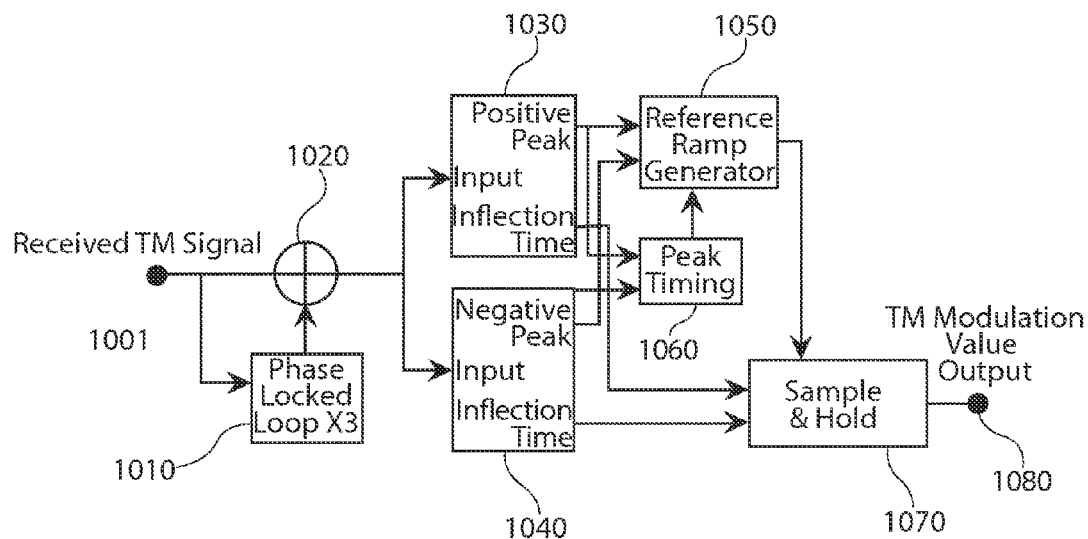
FIG. 10 is a block diagram illustrating a sub-cycle calibration system for demodulating a signal, in accordance with an embodiment provided by the present disclosure.

Systems and methods for receiving and demodulating Transpositional Modulation will now be disclosed. FIG. 10 is a block diagram illustrating a system a method for demodulating TM modulation signals, which may be referred to as "Sub-Cycle Calibration" (SCC). The SCC demodulation method of TM Modulation operates in the time domain by reconstruction of the waveform, for example as shown in the QC method section (e.g., signal 300 of FIG. 4).

The SCC method adds a third harmonic to the received signal 1001 in a wide bandwidth environment. A phase locked loop 1010 generates a precise and unmodulated third harmonic signal, which is added or multiplied to the received signal 1001 in element 1020. The voltage levels of each positive and negative peak is then detected by positive peak detector 1030 and/or negative peak detector 1040 and used to generate a reference ramp (by reference ramp generator 1050) with matching negative and positive peak values. Thus, at every ½ cycle of the received signal 1001 the system (i.e., the occurrence of each peak) is calibrated, as a new reference ramp is generated. The ramp is recreated with each half-cycle of the carrier signal 1001. The timing of the peaks is used by the peak timing element 1060 to set the timing of the reference ramp. Inflections are detected by the detectors 1030 and 1040 and the timing of the inflection is used to sample the reference ramp, output by the reference ramp generator 1050, and hold the sampled ramp value. That voltage is the TM modulation analog value and is output by the sample and hold element 1070, and may either be used directly or may be converted to digital. The reference ramp has a positive slope for the negative to positive carrier half cycle. For the next half carrier cycle (i.e., the positive to negative half cycle), the reference ramp has a negative slope.

An advantage of the SCC demodulation system and method is that it provides a robust demodulation technique. This is because SCC demodulation is concerned only with the occurrence of negative and positive peaks, and the presence of an inflection between these peaks. As such, SCC demodulation is much less susceptible to errors caused by noise than other demodulation techniques may be.

Figure 11:
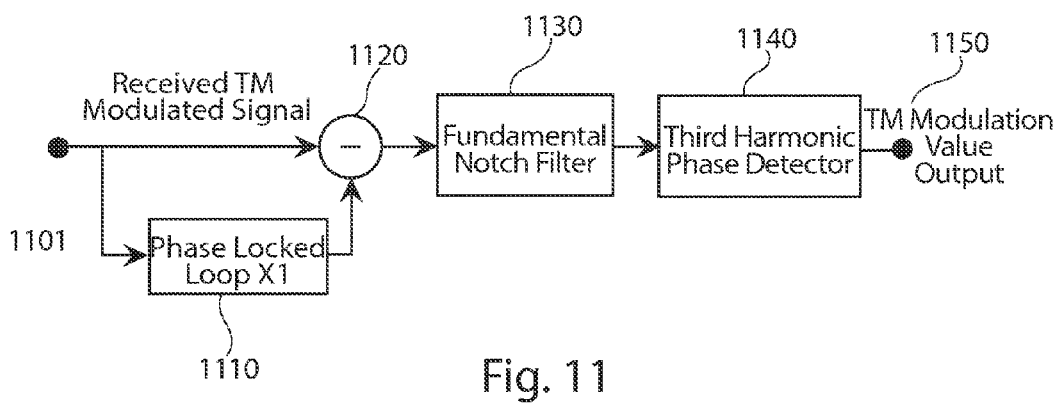
FIG. 11 is a block diagram illustrating a third harmonic phase detection system for demodulating a signal, in accordance with an embodiment provided by the present disclosure.

FIG. 11 is a block diagram illustrating a demodulation system and method, which may be called "Third-Harmonic Phase Detection" (3PD), in accordance with a further embodiment of the present disclosure. The Third-Harmonic Phase Detection (3PD) demodulation method of TM Modulation operates by regenerating a third harmonic component and demodulating a phase modulation existing on that component.

As shown in FIG. 11, the received TM modulated signal 1101 is used by a phase-locked loop 1110 to generate a stable, unmodulated fundamental carrier signal which is subtracted by subtraction element 1120 from the received signal 1101. The output from subtraction element 1120 may be filtered by a fundamental notch filter 1130 to filter out any spurious emissions at the fundamental carrier frequency. The remaining signal is thus the sideband energy (e.g., the TM modulation component) which drives a third harmonic phase detector 1140. The third harmonic phase detector. 1140 may be any known or conventional phase detector. The resulting output 1150 is the TM modulation analog value.

Figure 12:
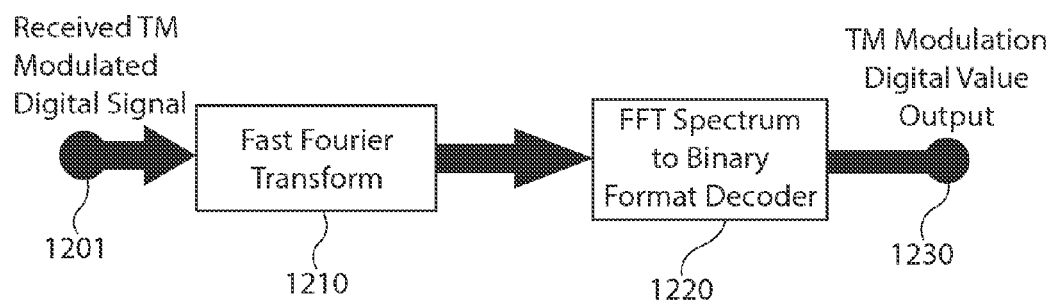
FIG. 12 is a block diagram illustrating a Fast Fourier Transform based system for demodulating a signal, in accordance with an embodiment provided by the present disclosure.

FIG. 12 is a block diagram illustrating a further demodulation system and method, in accordance with another embodiment of the present disclosure. The demodulation system and method shown in FIG. 12 is a Fast Fourier Transform (TMFFT) demodulation method of TM Modulation and operates by the analysis of the sideband spectrum.

The TMFFT method may provide the most simple hardware implementation; however it may also be the most complex in terms of signal processing. The TM modulated received signal 1201 is analyzed by an FFT function 1210 once it has been quantized by an analog-to-digital converter. Once the receiver has amplified the signal to a level suitable for conversion to digital bits, the signal is output to an element 1210, which may be a processor such as a computer CPU or a more dedicated processor such as a Field Programmable Gate Array or any custom integrated circuit specifically designed to calculate the Fourier Transform. The output of the FFT element 1210 is a number of data values representing the signal strength of the received TM signal 1201 at discrete frequencies. The TM spectrum is known since it relates to the TM mode of operation—the number of bits per symbol (i.e. number of assigned bits per TM modulation period) and the symbol rate.

The symbol rate equals the carrier frequency divided by the number of carrier cycles per symbol. Stated mathematically, in an illustrative example:

1 MHz carrier frequency/10 carrier cycles per symbol=100,000 symbols per second.

The frequency of the symbol is: 100,000 symbols per second/2=50,000 symbol cycles per second.

The frequency of interest in the example thus is 50 kHz, i.e., the symbol cycle frequency, which is 50 kHz above and below the carrier frequency. A more accurate FFT demodulation process will also look at 100 kHz and 150 kHz to include additional Bessel-related sidebands when there are many modulation levels such as 6 bits per symbol or 64 modulation levels. Also, when there are just a few carrier cycles per symbol, more sideband frequencies reduces the demodulation error rate. In some receivers the carrier frequency is heterodyned to an intermediate frequency (IF) for amplification or to baseband which places the carrier frequency at zero.

The 50 kHz FFT output value will have a value that follows the TM modulation. If the TM modulation has 4 bits per symbol, then a conversion from the numerical value of the FFT output, bracketed into 16 levels and converted to 4 binary bits produces the TM Modulation value.

Figure 13:
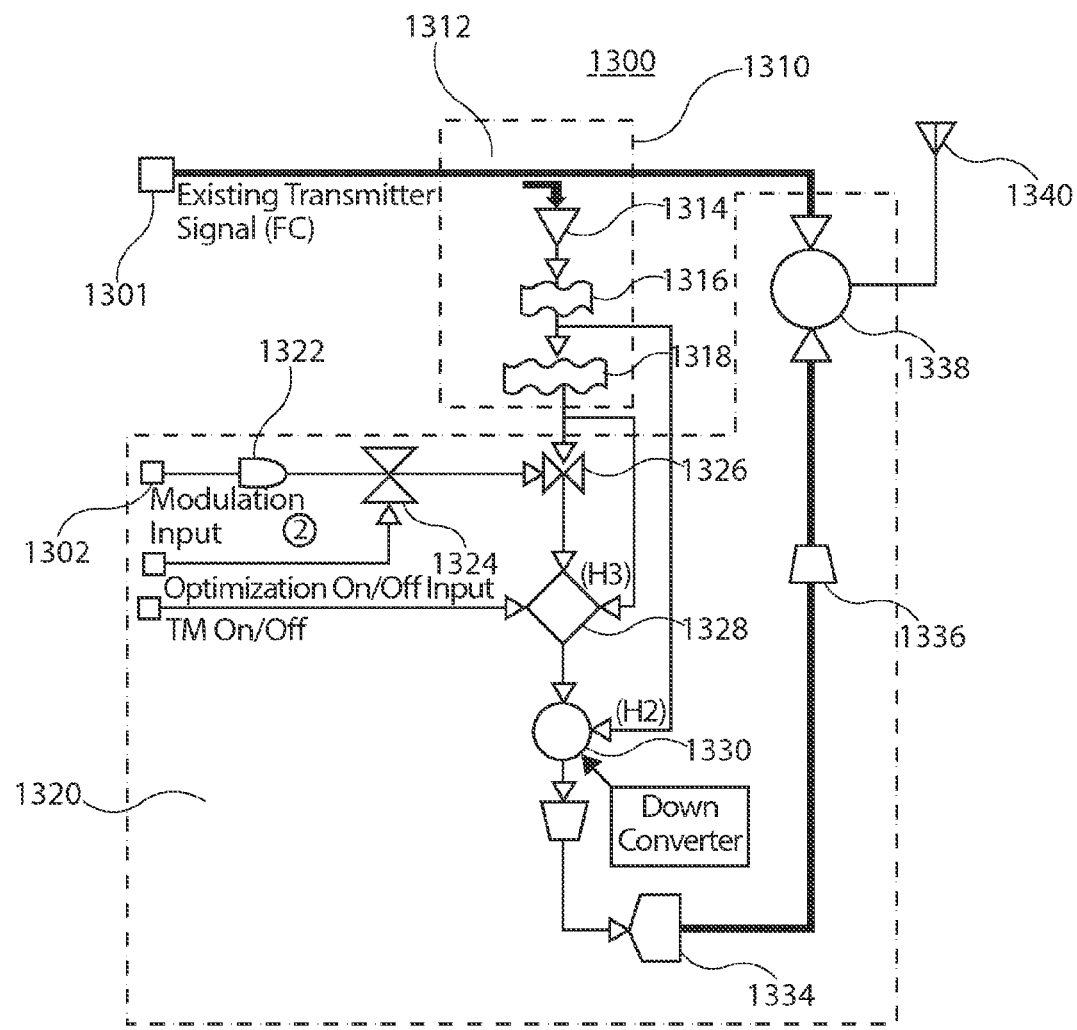
FIG. 13 is a block diagram illustrating a TM transmitter for generating and transmitting a signal composed of a TM signal that has been added to an existing signal, accordance with an embodiment provided by the present disclosure.

FIG. 13 is a block diagram illustrating a TM transmitter 1300 for generating and transmitting a signal composed of a TM signal that has been added to an existing signal (e.g. a modulated RF signal). The TM transmitter 1300 includes a carrier signal generating portion 1310 and a TM modulation signal processing portion 1320. An exemplary implementation of the carrier signal generating portion 1310 is shown in the block diagram of FIG. 14, and an exemplary implementation of the TM modulation signal processing portion 1320 is shown in the block diagram of FIG. 15.

The carrier signal generating portion 1310 serves to obtain a low level sample (e.g., by directional coupler 1312) of the existing signal 1301 (which may be modulated or not) and stripping any existing conventional modulation (e.g., AM, FM or any other conventional modulation forms) to obtain a single fundamental frequency carrier signal (FC—Fundamental Carrier). The existing conventional modulation may be stripped from the sample of the existing signal 1301 by a band pass filter stage 1314, which may have a narrow bandpass region selected to remove conventional modulations from the frequency carrier signal. A second harmonic generator 1316 generates a second harmonic signal (H2—Second Harmonic), for example, by multiplying the FC signal by itself. Similarly, a third harmonic generator 1318 generates a third harmonic signal (H3), for example, by multiplying the FC by H2. It will be appreciated that the first and second harmonic generators 1316, 1318 may be or include any known methods or circuits for generating harmonics, including for example, a phase-locked loop.

Figure 14:
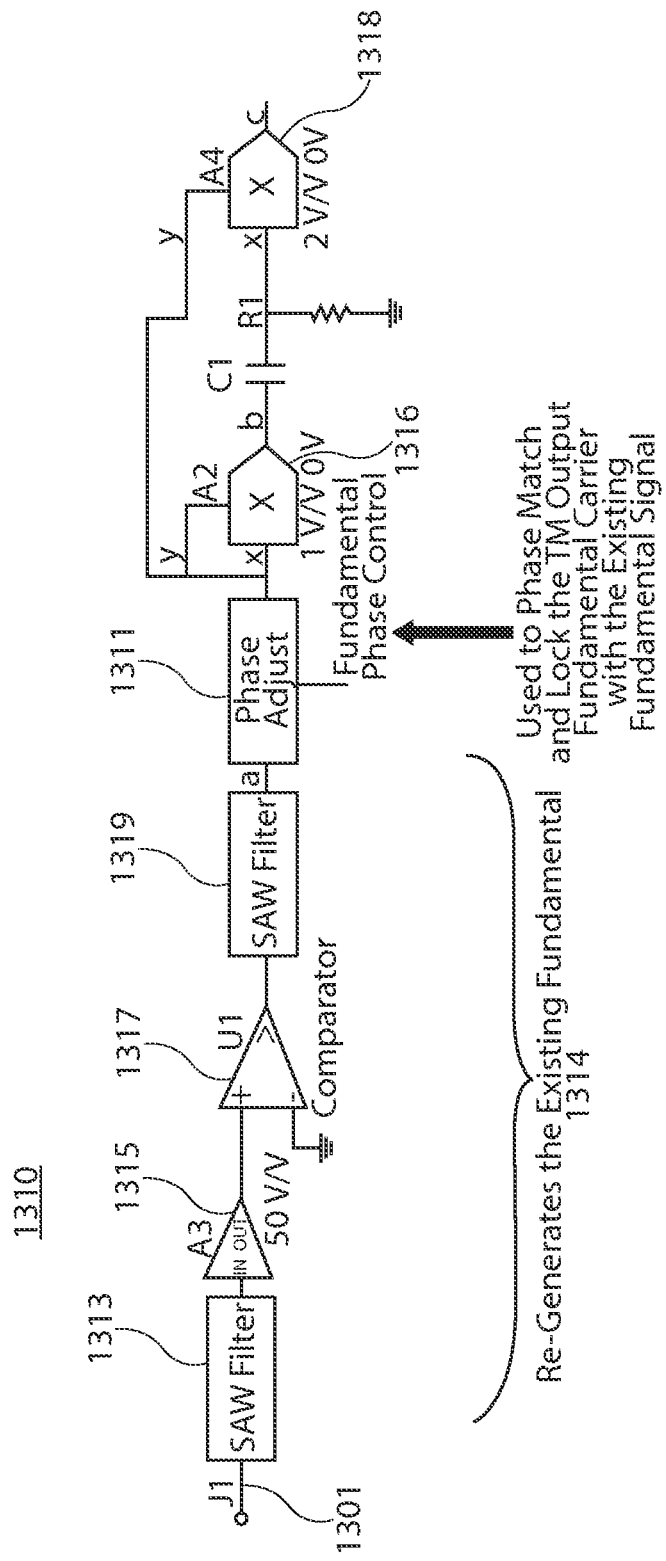
FIG. 14 is a block diagram illustrating an exemplary implementation of the carrier signal generating portion of a TM transmitter, in accordance with an embodiment provided by the present disclosure.

As shown in FIG. 14, the band pass filter stage 1314 may include a first SAW filter 1313 having a very-narrow bandwidth, a gain stage 1315, a comparator 1317 for stabilizing amplitude and a second SAW filter 1310 having a narrow bandwidth. A phase adjust stage 1311 may be included in the carrier signal generating portion 1310 to phase match and lock the TM output fundamental carrier with the existing fundamental signal (i.e., the FC). The second and third harmonic generators may be implemented as signal multipliers 1316, 1318.

Figure 15:
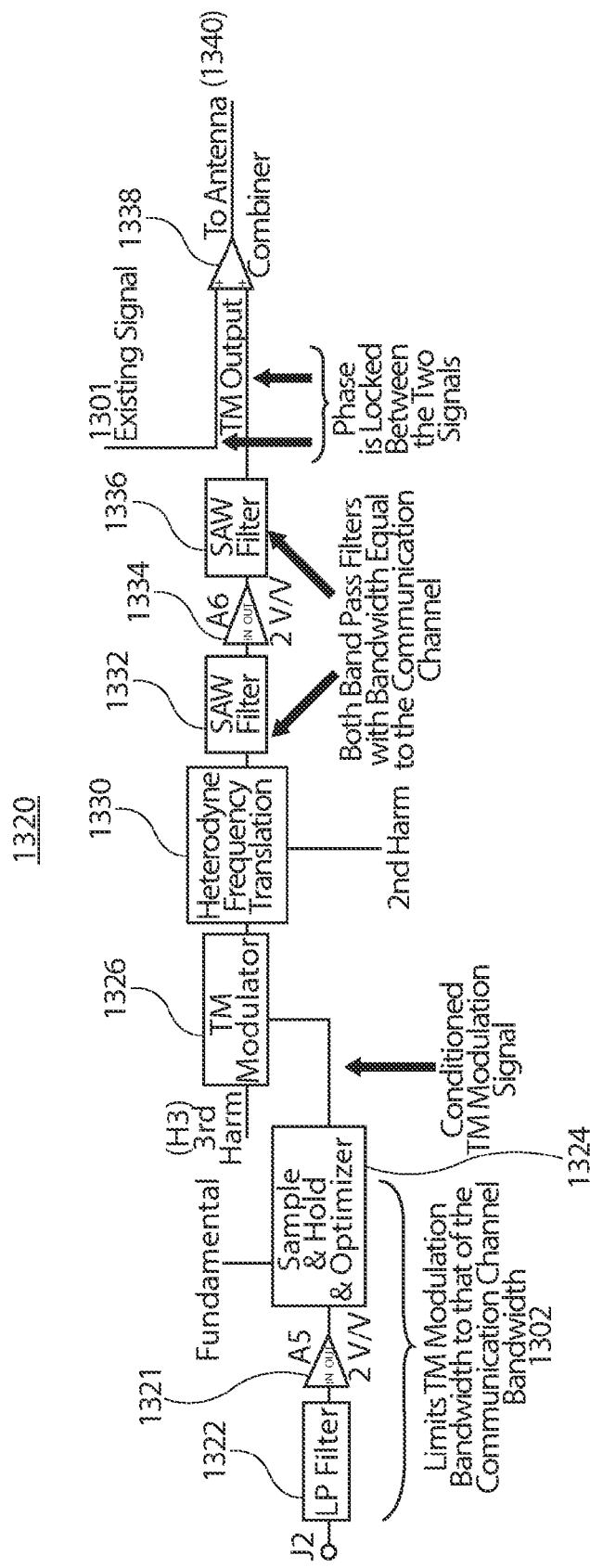
FIG. 15 is a block diagram illustrating an exemplary implementation of a TM modulation signal processing portion of a TM transmitter, in accordance with an embodiment provided by the present disclosure.

As shown in FIGS. 14 and 15, the TM fundamental carrier and existing signal fundamental carrier are noted as to be phase locked (e.g., by the phase adjust stage 1311). This may be accomplished by a feedback loop that places the TM modulation circuitry inside of a large phase locked loop in order to phase match the fundamental carrier signal of the TM output to the fundamental carrier of the existing signal at the combiner 1338.

The circuit shown in FIG. 14 is important as it generates signals at frequencies that are totally dependent on the precise existing signal frequency. Off-frequency signals do not operationally affect TM.

The TM modulation signal is processed through the TM modulation signal processing portion 1320. The TM modulation is placed on the third harmonic, frequency translated to the fundamental (FC) and combined with the existing signal 1301.

The TM modulation signal input 1302 to the TM modulation signal processing portion 1320 of the TM transmitter 1300 is analog in nature and bandwidth limited (e.g., by low-pass modulation Nyquist-limit filter 1322) to create sideband energy consistent with the communication channel bandwidth. The TM modulation signal is then processed by an inverting optimizer 1324 and a TM modulator (or time-shift modulator) 1326. As shown in FIG. 15, a gain stage 1321 may be included, and the inverting optimizer 1324 may include a sample and hold function, as well as optimizing. The low-pass filter 1322, gain stage 1321 and inverting optimizer 1324 serve to limit TM modulation bandwidth to that of the communication channel bandwidth. Optimization may be turned on or off via the presence or absence of an input signal to the inverting optimizer 1324.

The third harmonic signal (H3) drives the TM modulator (or time-shift modulator) 1326 by time-shifting the third harmonic. This produces a set of Bessel function sidebands. Only one set of upper and lower sidebands are needed for TM demodulation. These sidebands are limited in bandwidth with respect to the third harmonic by filtering of the TM modulation signal prior to the TM modulation process to match the communication channel bandwidth.

The present inventor has confirmed in simulation that time-shift modulation as disclosed herein, as opposed to phase shift modulation, produces only a single pair of sidebands. This is confirmed by oscilloscope and spectrum analyzer instrumentation in the lab. Phase modulation produces the Bessel series of sidebands as expected. The time-shift modulation, on the other hand, only produces one set of upper and lower sidebands.

The TM modulator (or time-shift modulator) 1326 may perform time-shift modulation through an All-Pass Filter modified with a Voltage-Controlled Time Delay. The control voltage is provided by the conditioned TM modulation signal (with or without optimization). Time-shifting takes place on the third Harmonic (H3) signal. While the TM modulator 1326 is described herein primarily with respect to time-shift modulation, it will be appreciated by those skilled in the relevant field that the TM modulator 1326 may similarly be a phase-shift modulator.

Further details regarding time-delay shifting circuits, principles and functionality, which may be utilized in the TM modulator (or time-shift modulator) 1326, are now described. For a single frequency input signal, such as a sinusoid, the time delay is analogous to a phase shift.

The all-pass filter may include an operational amplifier with a feedback resistor connected from the operational amplifier output and the negative or inverting operational amplifier input, and a second resistor of equal value connected from the negative or inverting operational amplifier input to a signal input, and the positive or non-inverting input connected to the mid junction of a series capacitor and resistor network with one end connected to the signal input and the other end connected to ground.

The value of the series capacitor or resistor may be modified with a control signal by using a four-quadrant multiplier with the multiplier output replacing the ground connection of the series R-C network and one input of the four-quadrant multiplier connected to the mid junction of the series network and the second input as the control signal input (i.e., the TM modulating signal).

The time-delay shifting of an input signal in accordance to an input control signal may produce a shift in phase as a shift of time.

A TM ON/OFF selector 1328 may be included that selects either the unmodulated third harmonic (H3) signal (e.g., output from the third harmonic generator 1318) or the TM modulated third harmonic signal (e.g., output from the time-shift modulator 1326). This function preserves the total power delivered to the transmitting antenna 1340 whether TM is in use or not.

The TM modulated H3 signal is down-converted in the down converter 1330 (or "heterodyne frequency translation" block 1330 shown in FIG. 15) by multiplying the TM modulated H3 signal with the second harmonic (H2) signal. This shifts the sideband energy of the TM modulated H3 signal to the FC frequency, and is then modulation bandpass filtered at FC by bandpass filter 1332.

The resulting FC-based TM signal then passes through an amplifier 1334 to provide a conventional amplification to establish a useable power level. The amplifier 1334 may be, for example, an RF power amplifier. The FC-based FM signal proceeds through a final bandwidth-limiting bandpass filter 1338 and a combiner 1338, where the TM output signal is added to the existing signal 1301. The resultant, combined signal is connected to the transmitting antenna 1340 for transmission. The phase is locked between the TM output signal and the existing signal 1301.

Figure 16:
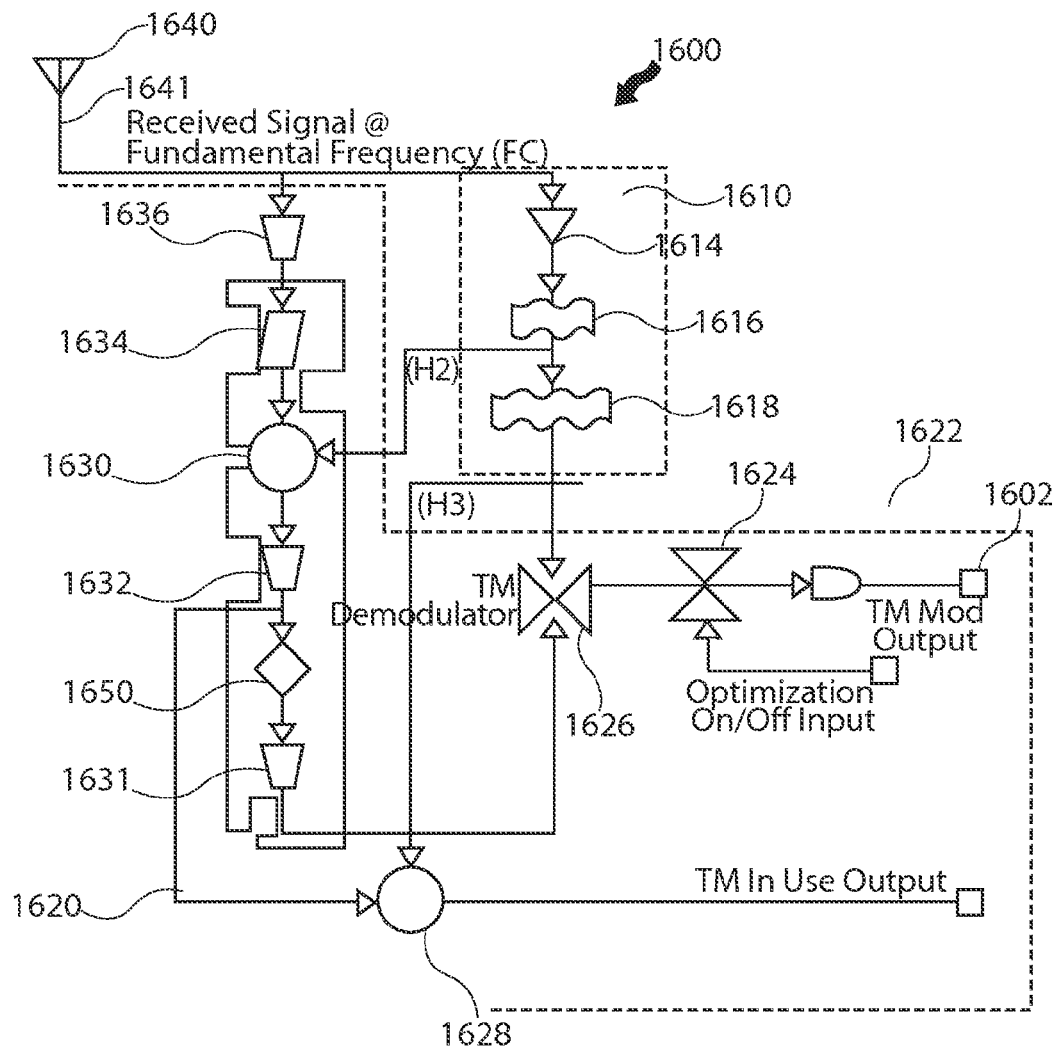
FIG. 16 is a block diagram illustrating a TM receiver for receiving a signal having a TM signal that has been added to an existing signal, and extracting and demodulating the TM signal, in accordance with an embodiment provided by the present disclosure.

FIG. 16 is a block diagram illustrating a TM receiver 1600 for receiving a combined signal 1641 (e.g., a TM signal that has been added to an existing signal), and extracting and demodulating the TM signal.

The TM receiver 1600 obtains the received, combined signal as close to the antenna 1640 or as close to the first generated IF (Intermediate Frequency) (e.g., output of an existing receiver, which is common in some communication equipment) as possible.

The TM receiver 1600 includes a carrier signal and harmonic recovery portion 1610 and a TM separation and demodulation portion 1620. An exemplary implementation of the carrier signal and harmonic recovery portion 1610 is shown in the block diagram of FIG. 17, and an exemplary implementation of the TM separation and demodulation portion 1620 is shown in the block diagram of FIG. 18.

The carrier signal and harmonic recovery portion 1610 of the TM receiver 1600 includes circuitry to perform the following: (a) Recover the existing fundamental carrier signal (FC) as an unmodulated signal, (b) generate the second and (c) the third harmonic signals of the recovered fundamental signal. These all act as local oscillator signals except they are accurately derived from the received signal. The circuits to do this are similar to those used in the transmitter 1300.

In the carrier signal and harmonic recovery portion 1610, the received signal 1641 (e.g., a combined RF signal having a TM signal added to an existing signal) from the receiving antenna 1640 or from the IF (Intermediate Frequency) output of an existing receiver (common in some communication equipment) is filtered by a very narrow bandpass filter stage 1614 to remove any existing modulation, resulting in a pure fundamental carrier signal (FC—Fundamental Carrier). The FC is multiplied by itself in a second harmonic generator 1616 to generate a second harmonic signal (H2). The FC and the second harmonic signal (H2) are multiplied together in a third harmonic generator 1618 to generate the third harmonic signal (H3).

Figure 17:
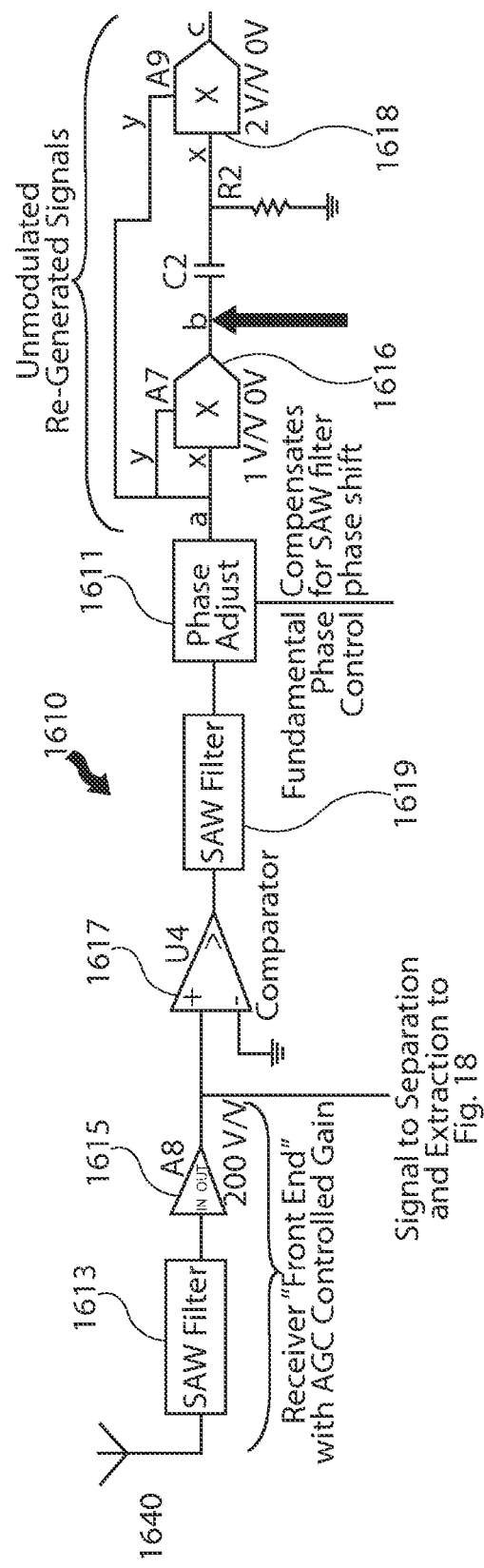
FIG. 17 is a block diagram illustrating an exemplary implementation of a carrier signal and harmonic recovery portion of a TM receiver, in accordance with an embodiment provided by the present disclosure.

As shown in FIG. 17, the receiver 1600 front end may have AGC (Automatic Gain Control) controlled gain and may include a SAW filter 1613 and a gain stage 1615. Similar to the carrier signal generating portion 1310 of the transmitter 1300, the carrier signal and harmonic recovery portion 1610 of the receiver 1600 may include a comparator 1617 and a second SAW filter 1619. A phase adjust stage 1611 may be included in the carrier signal and harmonic recovery portion 1610 to compensate for SAW filter phase shift. The second and third harmonic generators may be implemented as signal multipliers 1616, 1618.

In the TM separation and demodulation portion 1620, the received signal 1641 (after processing by the receiver front end with AGC controlled gain) is bandpass filtered by a bandpass filter 1636 with a bandwidth equal to the communication channel bandwidth.

The broadband received signal then enters a separation and extraction process. The first function is a differencing (performed by a time-delay amplifier 1634) between the received signal and a delayed version of that signal. The delay is equal to a quarter of the period of the third harmonic. The time-delay amplifier 1634 uses a time-delay based filter circuit (e.g., delay stage 1633 and difference amplifier stage 1635) that separates the received TM energy.

The separated signal (e.g., the fundamental frequency difference signal) is up-converted in the up-converter 1630 by multiplying with the (H2) signal. That is, the separated signal is heterodyned to the frequency of the third harmonic of the received fundamental signal (FC). The result is a third harmonic frequency signal (after filtering by bandpass filter 1632 to remove the fundamental product term) with TM modulation. There may be amplitude variation at this point due to existing carrier modulation and transmission media effects. This signal is thus presented to an analog comparator 1650 with a signal common reference, which produces a signal without amplitude variation. Filtering by the bandpass filter 1631 selects the third harmonic carrier frequency with TM modulation and eliminates other harmonics.

The output signal from the bandpass filter 1632 is not only directed to the analog comparator 1650, as discussed above, but it also is used as input to a TM signal detector 1628, which senses the presence of TM based on a correlation function (i.e., a comparison or correlation between the signal received as output from the bandpass filter 1632 and the third harmonic signal (H3) received as output from the third harmonic generator 1618). The TM signal detector 1628 outputs a signal indicating whether or not TM is in use, i.e., whether or not a TM signal is present in the received signal 1641.

The extraction process completes the separation and extraction of the TM signal from the received signal 1641. The extracted signal (e.g., output from the bandpass filter 1631) contains TM modulation that is time-shifted in comparison with the recovered reference third harmonic signal (e.g., (H3) derived from the received existing carrier signal used as a reference) needed to demodulate the TM information.

The TM Demodulator 1626 demodulates the TM signal by sensing the time shift between the third harmonic signal (H3) (received as a reference input from the third harmonic generator 1618) and the third harmonic signal with TM modulation (received as input from the bandpass filter 1631). The TM Demodulator 1626 may sense the time shift between the input signals using a multiplication of the two signals as a correlation function. Alternatively, the TM demodulator 1626 may use an Exclusive-OR function to detect the timing difference between the (H3) reference and the TM Modulated signal from the separation and extraction process.

The TM separation and demodulation portion 1620 may optionally include an inverting optimizer 1624 for recovering a signal transmitted by a transmitter having an inverting optimizer 1324 as discussed above.

The demodulated signal passes through a modulation low pass filter 1622 to remove any carrier and other noise sources, resulting in the TM modulation output signal 1602.

Figure 18:
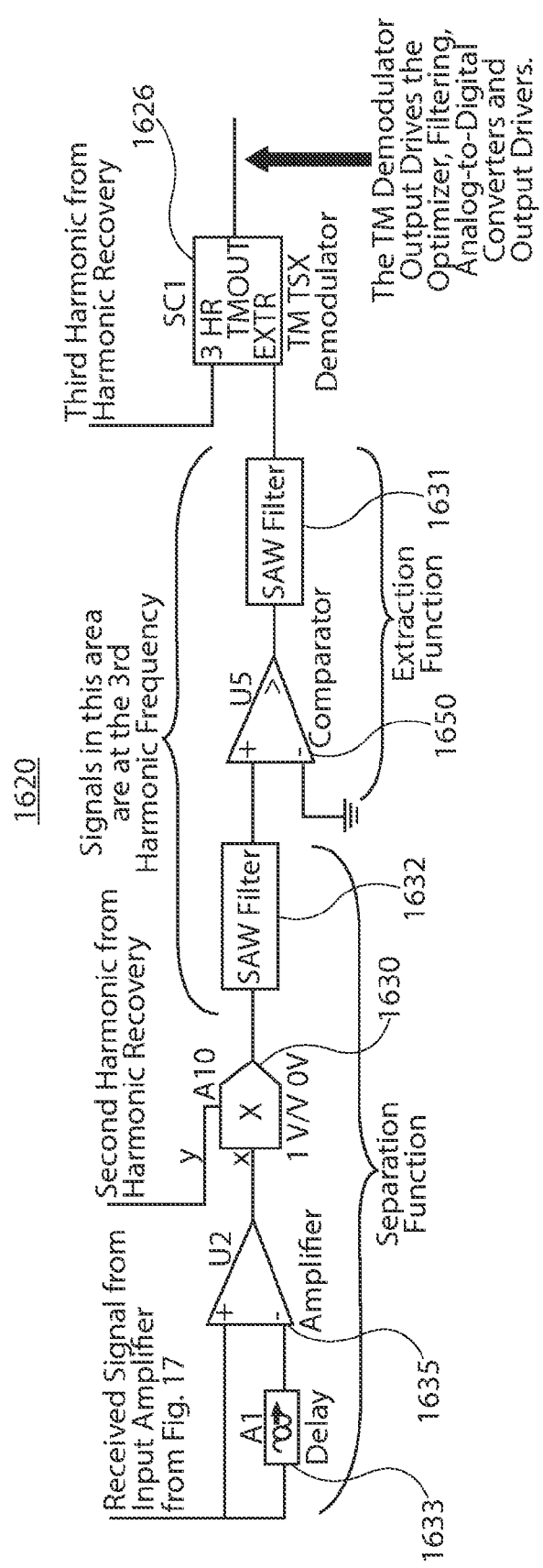
FIG. 18 is a block diagram illustrating an exemplary implementation of a TM separation and demodulation portion of a TM receiver, in accordance with an embodiment provided by the present disclosure.

FIG. 18 shows the basic set of functions for retrieving the received TM signal from the combined signal. The time-delay differentiator or filter (i.e., the delay stage 1633) may have an optimal set delay time of: $(0.25)/(3*f_{fc})$. Deviation from this value simply decreases the separated TM signal level although certain values will actually cancel the separated TM signal level. The extraction function simply eliminates amplitude variations of the separated signal.

Figure 19:
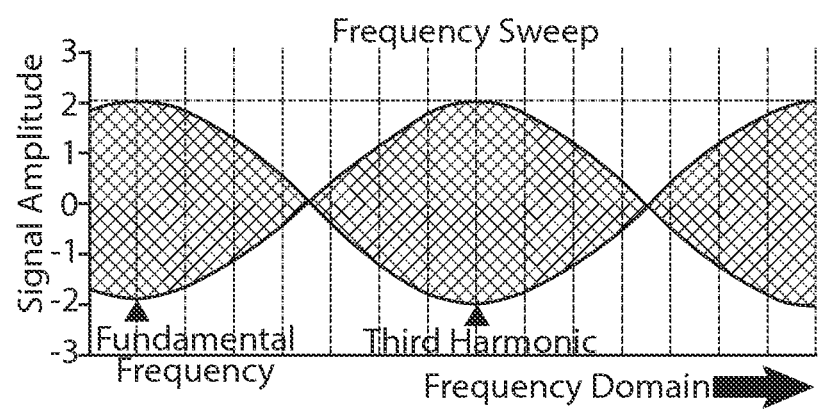
FIG. 19 is a graph illustrating frequency response behavior of the separator function's time-delay based filter circuit, in accordance with an embodiment provided by the present disclosure.

The separator function's time-delay based filter circuit, of FIG. 18, has a unique frequency response behavior as shown in FIG. 19. There is a periodic signal canceling at frequencies of DC, 6th harmonic, etc.

The existing signal receiver does not respond to the TM signal sideband energy. The addition of TM to an existing signal has the effect of reducing the signal-to-noise ratio (SNR) of the received existing signal. Likewise, there is a contribution of noise from the existing signal to the received TM signal.

The TM receiver 1600 relies on 2nd and 3rd harmonic signals related to the received fundamental signal. Frequency shifting due to Doppler effects or a variable signal path length (moving receiver or transmitter) has no effect on the demodulation of the TM signal since the whole process is referenced to the existing signal frequency.

As described above with respect to FIGS. 13-19, TM modulation may be provided on a carrier signal, which may be derived from any existing transmitter signal. The modulated TM signal may then be combined with the existing transmitter signal (modulated or unmodulated), thereby increasing the information bandwidth of the previously defined communication channel. While FIGS. 13-19 are discussed above with particular respect to TM signals, this is not intended to be limiting, as the same features and principles can be applied with any modulated signal. Information may be conveyed as a time or phase angle difference between two signals of different frequencies.

Methods are thus provided of increasing the information bandwidth of any defined communication channel by adding a second carrier signal having a frequency that is harmonically related to a first carrier signal frequency and is modulated with information independent of the information modulating the first carrier signal. The second signal and the modulation sidebands may be heterodyned to the frequency of the first carrier signal, and the modulation sideband may be equal to or less than the bandwidth of the communication channel.

The first carrier signal and the second modulated carrier signal may be transmitted without any modification.

The first carrier signal may be modulated (with any type of modulation) or unmodulated, and the second carrier signal may have time-shifting or angular modulation. The second carrier signal may have a frequency with a known relationship to the frequency of the first carrier signal. Similarly, the second carrier signal may have a phase angle or timing relationship to the first carrier signal. The information to be conveyed may cause a time-shifting or angular modulation of the second carrier signal, and the means of the modulation of the second carrier signal may vary the time or phase angle relationship with the first carrier signal.

The time-shifted or angular modulation of the second carrier signal produces sideband energy which is shifted in frequency to occupy the same frequency range as that of the, if any, modulation of the first carrier signal or that is placed within the communication channel bandwidth that would be used for communication. The combination of the first carrier signal and the sidebands of the second carrier signal may be transmitted together within frequency limits of a communication channel and received by a receiving device. Additionally, the combination of the two carrier signals may be transmitted without bandwidth restrictions and received by a receiving device.

A receiving device may demodulate the modulation information of the second carrier signal using the first carrier signal as a reference signal for demodulation.

Also provided herein are quadrature transpositional modulation methods, or methods for adding a second transpositional modulated (TM) signal to an existing transpositionally modulated signal, thereby increasing the information bandwidth within a fixed communication channel beyond that provided by transpositional modulation as previously described.

In one embodiment, a second transpositional modulation signal may be added to an existing transpositional modulated signal by using a fundamental carrier signal frequency that is of the same frequency as the existing transpositional modulated signal but differs in phase by 90 degrees or a quadrature phase. This maintains the mutual transparency property of transpositional modulation with conventional amplitude, frequency and phase modulations. The addition of the quadrature transpositional modulated signal also has mutual transparency between the two transpositional modulated carriers and both have transparency with the existing conventional modulated signal.

Transpositional modulation may be utilized in many ways, including, for example, for optical communication. Provided herein are methods of placing a wide-bandwidth transpositional modulation signal directly on an optical-frequency beam for increased data bandwidth communication.

Optical beams are used for their wide-bandwidth properties. They are modulated by various means. Transpositional modulation may be placed onto an optical beam for communication of information in various ways, all of which are contemplated by and within the scope of the present disclosure.

One such example, may be described as follows. A carrier signal is required for any modulation method to convey information. Transpositional modulation can use an existing modulated carrier signal for the transpositional modulation carrier. Transpositional modulation may also supply a carrier signal if none are present. The transpositional modulated carrier signal, whether using an existing signal or not, is used to drive an optical modulator.

Optical modulators range from light emitting diode drivers, laser diode drivers to optical beam modulators that alter opacity or phase of the light beam. Provided by the disclosure herein is the ability to apply a transpositional modulated carrier signal to a single modulator device. This can increase the existing information bandwidth that uses conventional amplitude, frequency or phase modulation.

Without any other modulation present, the unrestricted-bandwidth transpositional modulation signal that would include the third harmonic component of transpositional modulation is transmitted. This places the fundamental frequency component at a lower frequency where there is typically less attenuation. Transpositional demodulation relies on this component for reference. The higher frequency third harmonic component has a wider bandwidth allowing the widest possible information modulation bandwidth.

In another embodiment, two separate optical beams may be utilized, where the lower frequency beam is modulated conventionally (e.g., with amplitude or phase modulation) and is also used as the reference carrier for transpositional modulation. The higher frequency optical beam is used for the transpositional modulation third harmonic component.

Another way that transpositional modulation can be used is in ultrasound communications, such as for underwater wireless communication. For example, in an embodiment, a transpositional modulated signal may be applied to an ultrasonic transducer to generate an acoustic signal, and the acoustic signal may be received and demodulated to recover the original modulation information. The modulation process imposes a near-zero impedance drive that forces the transducer to operate beyond the natural resonant frequency of the transducer.

In addition to the wide-bandwidth of the modulation, the receiver may use a natural wide-bandwidth transducer based on technologies that transduce acoustic energy into electrical energy without resonant peak response. Such a receiving transducer is manufactured using MEMS, MicroElectroMechanical Systems, technology that provides a wide band response with sensitivity.

One transpositional modulation carrier frequency can be used. Two separate ultrasonic frequencies can be used to convey the fundamental carrier signal component and the third harmonic component signal individually.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of increasing the bandwidth of a signal, the method comprising:
   receiving a sample of a first modulated signal, the first modulated signal including a carrier signal modulated with a non-transpositional modulation signal;
   removing the non-transpositional modulation signal from the sample of the first modulated signal to obtain the carrier signal;
   modulating the carrier signal with a transpositional modulation signal to obtain a second modulated signal;
   combining the second modulated signal with the first modulated signal to produce a combined signal; and
   transmitting the combined signal.

2. The method of claim 1, wherein the modulating of the carrier signal with the transpositional modulation signal to obtain the second modulated signal comprises:
   generating a third harmonic of the carrier signal;
   modulating the third harmonic of the carrier signal to produce the transpositional modulation signal; and
   frequency-shifting the transpositional modulation signal to a frequency of the carrier signal.

3. The method of claim 2, further comprising generating a second harmonic of the carrier signal, and
   wherein frequency-shifting the transpositional modulation signal to a frequency of the carrier signal comprises mixing the transpositional modulation signal with the second harmonic of the carrier signal.

4. The method of claim 2, wherein modulating the third harmonic of the carrier signal to produce the transpositional modulation signal comprises time-shifting the third harmonic of the carrier signal based on a data signal.

5. The method of claim 1, further comprising matching a phase of the second modulated signal with a phase of the first modulated signal.

6. The method of claim 1, wherein the non-transpositional modulation signal is one of: an amplitude modulated signal, a frequency modulated signal, or a phase modulated signal.

7. The method of claim 1, further comprising adding a third modulated signal to the combined signal, the third modulated signal including a second transpositional modulated signal and a second carrier signal, wherein the second carrier signal is phase shifted 90 degrees with respect to the carrier signal.

8. A time-shift modulator comprising an all-pass filter modified with a voltage-controlled time delay, wherein the all-pass filter comprises:
   an operational amplifier having a feedback resistor connected between an output of the operational amplifier and an inverting input of the operational amplifier;
   a second resistor having a resistance substantially equal to a resistance of the feedback resistor, the second resistor being connected between the inverting input of the operational amplifier and a signal input; and
   a series capacitor and resistor network, the series capacitor and resistor network having a first end connected to the signal input, a second end connected to ground, and a mid-junction connected to the non-inverting input of the operational amplifier.

9. The time-shift modulator of claim 8, wherein an impedance value of the series capacitor and resistor network is modified with a control signal by using a four-quadrant multiplier, wherein the control signal is a transpositional modulation (TM) data modulating signal.

10. A method of increasing communication bandwidth within a fixed communication channel, comprising:
    adding a second transpositional modulated signal to a combined signal, the combined signal comprising a first transpositional modulated signal and a first fundamental carrier signal, wherein the second transpositional modulated signal is added to the combined signal using a second fundamental carrier signal having a same frequency as the first fundamental carrier signal, and having a phase angle of 90 degrees with respect to the first fundamental carrier signal.

11. The method of increasing communication bandwidth of claim 10, characterized by one or both of the following features:
    (a) wherein the information bandwidth is doubled without increasing the communication channel bandwidth; and
    (b) wherein the spectral efficiency of the transpositional modulation is increased.

12. A system comprising:
    at least one processor; and
    a data store coupled to the at least one processor having instructions stored thereon which, when executed by the at least one processor, causes the at least one processor to perform operations comprising:
    receiving a sample of a first modulated signal, the first modulated signal including a carrier signal modulated with a non-transpositional modulation signal;
    removing the non-transpositional modulation signal from the sample of the first modulated signal to obtain the carrier signal;
    modulating the carrier signal with a transpositional modulation signal to obtain a second modulated signal;
    combining the second modulated signal with the first modulated signal to produce a combined signal; and
    transmitting the combined signal.

13. The system of claim 12, wherein the modulating of the carrier signal with the transpositional modulation signal to obtain the second modulated signal comprises:
    generating a third harmonic of the carrier signal;
    modulating the third harmonic of the carrier signal to produce the transpositional modulation signal; and
    frequency-shifting the transpositional modulation signal to a frequency of the carrier signal.

14. The system of claim 13, wherein the operations further comprise generating a second harmonic of the carrier signal, and
    wherein frequency-shifting the transpositional modulation signal to a frequency of the carrier signal comprises mixing the transpositional modulation signal with the second harmonic of the carrier signal.

15. The system of claim 13, wherein modulating the third harmonic of the carrier signal to produce the transpositional modulation signal comprises time-shifting the third harmonic of the carrier signal based on a data signal.

16. The system of claim 12, wherein the operations further comprise matching a phase of the second modulated signal with a phase of the first modulated signal.

17. The system of claim 12, wherein the non-transpositional modulation signal is one of: an amplitude modulated signal, a frequency modulated signal, or a phase modulated signal.

18. The system of claim 12, wherein the operations further comprise adding a third modulated signal to the combined signal, the third modulated signal including a second transpositional modulated signal and a second carrier signal, wherein the second carrier signal is phase shifted 90 degrees with respect to the carrier signal.

19. A system comprising:
at least one processor; and
a data store coupled to the at least one processor having instructions stored thereon which, when executed by the at least one processor, causes the at least one processor to perform operations comprising:
adding a second transpositional modulated signal to a combined signal, the combined signal comprising a first transpositional modulated signal and a first fundamental carrier signal, wherein the second transpositional modulated signal is added to the combined signal using a second fundamental carrier signal having a same frequency as the first fundamental carrier signal, and having a phase angle of 90 degrees with respect to the first fundamental carrier signal.

* * * * *